Patented July 25, 1950

2,516,337

UNITED STATES PATENT OFFICE 2,516,337

MANUFACTURE OF 5-AMINO-1-PENTANOL AND ALKYL DERIVATIVES THEREOF

John F. Olin, Grosse Ile, Mich., assignor to Sharples Chemicals Inc., Philadelphia, Pa., a corporation of Delaware No Drawing. Application May 28, 1946,
Serial No. 672,909

10 Claims. (Cl. 260—584)

The present invention relates to a new process for the manufacture of 5-amino-1-pentanol and to its N-alkyl derivatives.

Amino alcohols of this description have been prepared in the past by tedious and expensive procedures. For example, a 1,5-dihalopentane is condensed with phthalimide and the product is then hydrolyzed, or, alternatively, the dihalide is reacted with silver nitrite and the resulting nitro group is then reduced to form the desired amino alcohol. When an N-substituted amino alcohol is required, its synthesis by a series of classical steps is even more involved and expensive, and, in fact, very few 5-alkylamino-1-pentanols are reported in the literature. Such compounds are, nevertheless, of great value, particularly as intermediates in the preparation of anti-malarials and other pharmaceuticals.

I have discovered that these products can be prepared simply and in good yield by the reductive amination of 2-hydroxypentamethylene oxide. My reaction may be illustrated by the following chemical equation:

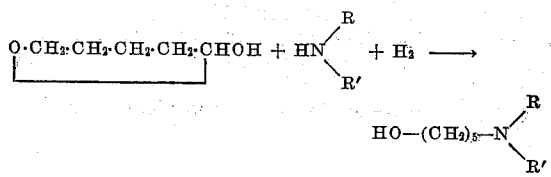

wherein R and R' are chosen from the class consisting of hydrogen and alkyl radicals. The reaction may be catalyzed by the use of any effective hydrogenation catalyst, for example, nickel, platinum, palladium or cobalt.

In the practice of my process a suitable pressure-resistant vessel may be charged, for instance, with 1.5 gram moles of amine and 30 grams of Raney nickel. Hydrogen is then introduced until the pressure reaches about 1000 pounds per square inch, and the contents are heated with agitation to a temperature between 100° and 125° C. One gram mole of 2-hydroxypentamethylene oxide is then introduced progressively, the said temperature being maintained and make-up hydrogen being introduced until no further tendency to absorb hydrogen is apparent. The contents are cooled, residual hydrogen is eliminated by venting, the catalyst is separated by filtration and finally the product is purified by fractional distillation in vacuo. The corresponding 5-alkylamino-1-pentanol is thus recovered in exceptionally pure form and in yields which generally fall between 70% and 95% depending upon the particular amine entering into the reaction. By an entirely analogous procedure ammonia may be used instead of the alkyl amine to give approximately a 90% yield of 5-amino-1-pentanol.

The 2-hydroxypentamethylene oxide may conveniently be prepared by the procedure of R. Paul, Bull. Soc. Chim. (S), 1, 971–80 (1934), which essentially comprises the hydration of dihydropyrane. Since dihydropyrane is known to be easily prepared from tetrahydrofurfuryl alcohol by catalytic dehydration, the process of the present invention makes it possible to manufacture valuable and heretofore expensive aminopentanols from relatively plentiful raw materials by the following sequence:

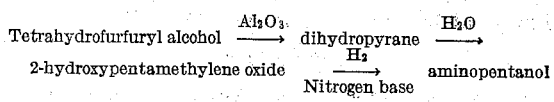

It is noteworthy that overall yields based upon the tetrahydrofurfuryl alcohol are generally above 55% and are frequently above 65%.

The nitrogen-containing bases which are suitable for the practice of my invention are those having the structure

wherein R and R' may be hydrogen or alkyl groups. Thus are included ammonia, dimethyl-, monomethyl-, diethyl-, monoethyl-, methylethyl-, isopropyl-, di-isopropyl-, butyl-, amyl-, and hexyl-amine, and, in fact, any primary or secondary alkylamine, any alkyl substituent of which may contain from one to sixteen or more carbon atoms.

The reductive amination reaction of the present invention may be practiced under conditions which vary considerably from those hereinbefore recited. Thus the reaction may be conducted at temperatures limited only on the one hand by the activity of the catalyst and, on the other, by the stability of the product and the reactants. By a suitable selection of hydrogenating catalyst, chosen from the hydrogenating metals, metal oxides and salts known to the art, temperatures ranging from 20° C. to 200° C. may be successfully employed. The pressure exerted by the hydrogen is not critical, high pressures merely tending to expedite the reaction.

A moderate excess of amine is generally employed although it is feasible to operate with an excess of the hydroxypentamethylene oxide. If optimum yields are to be obtained, the hydroxypentamethylene oxide should not be subjected to hydrogenating conditions in the absence of substantial proportions of amine or ammonia. For example, the reactants may be introduced consecutively or substantially concurrently into a batchwise reaction system, or they may be caused to flow concurrently through a system of the continuous type. Inert solvents may be employed if desired. In the isolation of the desired amino alcohol distillation is suitable for those products which are of sufficient thermal stability and volatility, but it is obvious that other known procedures may be employed and indeed, in certain instances, may be preferable.

The following examples will further illustrate various aspects of my invention:

Example 1

1850 grams of isopropylamine, 100 grams of Raney nickel catalyst and 500 ml. of methanol were placed in a 2 gallon autoclave with hydrogen at 500 pounds per square inch and were heated to 116° C. with agitation. At that temperature 1850 grams of 2-hydroxypentamethylene oxide were pumped in over a period of 15 minutes. Hydrogen was added at intervals to maintain a pressure of 700–1000 pounds per square inch. Heating and stirring were continued until there was no further drop in pressure (15 minutes). The autoclave was cooled, and its contents were discharged and filtered, and then distilled through a fractionating column to yield 2082 grams of 5-isopropylamino-1-pentanol. This amounts to a conversion of 79% based on the oxide. The product distilled between 120° and 125° C. at 12 mm. and solidified at 45° C.

Example 2

By the procedure of Example 1, 3 pounds of Raney nickel, 1 gallon of methanol, 60 pounds of isopropylamine, 60 pounds of 2-hydroxypentamethylene oxide and hydrogen were reacted in a 25 gallon autoclave to yield upon fractionation 55.5 pounds of 5-isopropylamino-1-pentanol. This represents a conversion of 67.5%.

Example 3

By the procedure of Example 1, the reaction using 1971 grams of diethylamine, 100 grams Raney nickel catalyst, 1,530 grams of 2-hydroxypentamethylene oxide and hydrogen gave 2,208 grams of 5-diethylamino-1-pentanol, distilling between 124° and 129° C. at 20 mm. The conversion was 92.2%.

Example 4

By the procedure of Example 1, 765 grams of ammonia, 1530 grams of 2-hydroxypentamethylene oxide and hydrogen were reacted in the presence of 100 grams of Raney nickel catalyst and 300 ml. of methanol. The initial pressure was 800 pounds per square inch and the maximum was about 1,250 pounds per square inch during the reaction. Distillation of the crude product gave 1,349 grams of 5-amino-1-pentanol, which distilled between 119° and 122° C. at 18 mm. The conversion amounted to 87.3%.

While the invention has been described primarily with reference to a process in which the hydrogen is present during the entire condensation reaction, it may be practiced by an alternative procedure in which the ammonia or amine is first condensed with the 2-hydroxypentamethylene oxide and the resulting condensation product thereafter hydrogenated. The following example illustrates the practice of the invention by this sequence of steps.

Example 5

679 grams of crude 2-hydroxypentamethylene oxide, 1,500 ml. of hexane and 360 grams of isopropylamine were mixed and refluxed 30 minutes. Water (87 ml.) was formed and was separated. The oil layer was then hydrogenated in the presence of 300 grams of Raney nickel catalyst at 1,000–1,275 pounds per square inch hydrogen pressure and at a temperature of 70–100° C. The reaction required 30 minutes. The catalyst was filtered off and the solvent removed by distillation. Fractionation of the residue gave two cuts, 170 grams of an impure fraction containing substantial quantities of 5-isopropylamino-1-pentanol and 197 grams of pure 5-isopropylamino-1-pentanol boiling between 123–125° C. at 12 mm. Hg pressure and solidifying at 42° C.

Since various modifications are available within the scope of the invention, I do not wish to be limited except by the scope of the following claims:

I claim:

1. In the preparation of amino alcohols of the structure

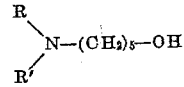

the process comprising reacting 2-hydroxypentamethylene oxide with a compound of the structure

wherein R and R' are chosen from the class consisting of hydrogen and alkyl radicals having less than 17 carbon atoms, and with hydrogen, said reaction taking place under elevated pressure conditions and in the presence of a hydrogenating catalyst.

2. In the preparation of amino alcohols of the structure

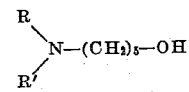

the process comprising reacting 2-hydroxypentamethylene oxide with a compound of the structure

wherein R and R' are chosen from the class consisting of hydrogen and alkyl radicals having less than 17 carbon atoms, and with hydrogen, said reaction taking place under elevated temperature and pressure conditions and in the presence of a hydrogenating catalyst.

3. In the preparation of amino alcohols of the structure

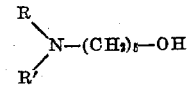

the process comprising reacting 2-hydroxypentamethylene oxide with a compound of the structure

wherein R and R' are chosen from the class consisting of hydrogen and alkyl radicals having less than 17 carbon atoms, and with hydrogen, said reaction taking place under elevated temperature and pressure conditions and in the presence of a nickel-containing hydrogenating catalyst.

4. In the preparation of amino alcohols of the structure

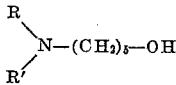

the process comprising reacting 2-hydroxypentamethylene oxide with a compound of the structure

wherein R and R' are chosen from the class consisting of hydrogen and alkyl radicals having less than 17 carbon atoms, and with hydrogen, said reaction taking place under elevated pressure conditions in the presence of a hydrogenating catalyst and at a temperature between 30° and 200° C.

5. In the preparation of 5-isopropylamino-1-pentanol, the process comprising reacting 2-hydroxypentamethylene oxide with isopropylamine and hydrogen, said reaction taking place under elevated temperature and pressure conditions and in the presence of a hydrogenating catalyst.

6. In the preparation of 5-diethylamino-1-pentanol, the process comprising reacting 2-hydroxypentamethylene oxide with diethylamine and hydrogen, said reaction taking place under elevated temperature and pressure conditions and in the presence of a hydrogenating catalyst.

7. In the preparation of 5-amino-1-pentanol, the process comprising reacting 2-hydroxypentamethylene oxide with ammonia and hydrogen, said reaction taking place under elevated temperature and pressure conditions and in the presence of a hydrogenating catalyst.

8. In the preparation of amino alcohols of the structure

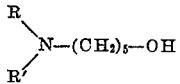

the process comprising condensing 2-hydroxypentamethylene oxide with a compound of the structure

wherein R and R' are chosen from the class consisting of hydrogen and alkyl radicals having less than 17 carbon atoms, and thereafter hydrogenating the resulting condensation product in the presence of a hydrogenating catalyst and under elevated temperature and pressure conditions.

9. In the preparation of amino alcohols of the structure

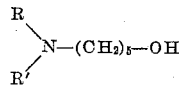

the process comprising reacting 2-hydroxypentamethylene oxide with a compound of the structure

wherein R and R' are chosen from the class consisting of hydrogen and alkyl radicals having less than 17 carbon atoms, and with hydrogen, the reaction being performed by maintaining the compound of the structure

under pressure of hydrogen and introducing the 2-hydroxypentamethylene oxide into said compound while said last-mentioned compound is under said hydrogen pressure.

10. The process of claim 9 in which the compound of the structure

is maintained present in the zone of reaction in stoichiometric excess with respect to the 2-hydroxypentamethylene oxide throughout the reaction.

JOHN F. OLIN.

REFERENCES CITED

The following references are of record in the file of this patent:

UNITED STATES PATENTS

| Number | Name | Date |
|---|---|---|
| 2,182,087 | Hasche | Dec. 12, 1939 |
| 2,349,222 | Goshorn | May 16, 1944 |
| 2,365,825 | Kyrides | Dec. 26, 1944 |

FOREIGN PATENTS

| Number | Country | Date |
|---|---|---|
| 415,691 | Great Britain | Nov. 23, 1932 |

OTHER REFERENCES

Paul, "Bull. soc. chim." (5) vol. 1, pages 971–980 (1934).

Adkins, "Reactions of Hydrogen," Univ. of Wis. Press, page 135.